United States Patent [19]

Asada

[11] Patent Number: 5,007,887
[45] Date of Patent: Apr. 16, 1991

[54] PLANETARY GEAR TRANSMISSION FOR MOTOR VEHICLE

[75] Inventor: Toshiyuki Asada, Susono, Japan

[73] Assignee: Toyota Jidosha Kabushiki Kaisha, Toyota, Japan

[21] Appl. No.: 437,838

[22] Filed: Nov. 17, 1989

[30] Foreign Application Priority Data

Nov. 21, 1988 [JP] Japan ............................. 63-294158

[51] Int. Cl.$^5$ ............................................. F16H 57/10
[52] U.S. Cl. ..................................... 45/284; 475/280; 475/285
[58] Field of Search ............... 475/271, 284, 285, 296, 475/313, 320, 330, 280

[56] References Cited

U.S. PATENT DOCUMENTS

| | | | |
|---|---|---|---|
| 3,811,343 | 5/1974 | Mori et al. ............................ | 475/285 |
| 3,946,624 | 3/1976 | Murakami et al. ................... | 475/284 |
| 3,971,267 | 7/1976 | Murakami et al. ................... | 475/276 |
| 4,007,648 | 2/1977 | Bookout .............................. | 475/285 |
| 4,528,869 | 7/1985 | Kubo et al. ......................... | 4475/285 |
| 4,660,439 | 4/1987 | Hiraiwa .............................. | 475/285 |

FOREIGN PATENT DOCUMENTS

| | | |
|---|---|---|
| 50-32913 | 10/1975 | Japan . |
| 51-3012 | 1/1976 | Japan . |
| 51-17767 | 2/1976 | Japan . |
| 51-48062 | 4/1976 | Japan . |
| 51-108168 | 9/1976 | Japan . |
| 51-108170 | 9/1976 | Japan . |
| 51-127968 | 11/1976 | Japan . |
| 0123762 | 10/1978 | Japan ............... 475/284 |
| 0084445 | 5/1985 | Japan ............... 475/285 |
| 62-9049 | 1/1987 | Japan ............... 475/284 |
| 1601793 | 11/1981 | United Kingdom ... 475/280 |

Primary Examiner—Rodney H. Bonck
Assistant Examiner—Ryan Massey
Attorney, Agent, or Firm—Cushman, Darby & Cushman

[57] ABSTRACT

A transmission including a first and a second single-pinion planetary gear unit and a third double-pinion planetary gear unit, which are coaxially disposed so as to provide different speed reduction ratios. The three gear units have respective first, second and third sun gears, respective first, second and third planetary gears, respective first, second and third ring gears, and respective first, second and third carriers. The first and second sun gears are fixed to each other for rotation as a unit, or connectable to each other by a coupling device. The first carrier and the second ring gear are fixed to each other or connectable by a coupling device. The first and third ring gears are fixed to each other or connectable to each other by a coupling device. The second and third carriers are fixed to each other or connectable by a coupling device. This arrangement allows shifting operations of the transmission, without racing of the engine or locking of the transmission.

24 Claims, 12 Drawing Sheets

| | K1 | K2 | K3 | B1 | B2 | B3 | SPEED REDUCTION RATIO ($\rho1=0.355$, $\rho2=0.395$, $\rho3=0.278$) | |
|---|---|---|---|---|---|---|---|---|
| 1ST-SPEED | ○ | ○ | | ○ | | | $(1+\rho2)/\rho2$ | 3.532 |
| 2ND-SPEED | ○ | ○ | | | ○ | | $(1+\rho1)(1+\rho2)/(\rho1+\rho2+\rho1\rho2)$ | 2.123 |
| 3RD-SPEED | ○ | ○ | | | | ○ | $\{(\rho1+\rho2+\rho1\rho2)+\rho3\}/(\rho1+\rho2+\rho1\rho2)$ | 1.312 |
| 4TH-SPEED | ○ | ○ | ○ | | | | 1 | 1.000 |
| 5TH-SPEED | ○ | | ○ | | | ○ | $1-\rho3$ | 0.722 |
| REAR | ○ | | | ○ | | ○ | $-(1-\rho3)/\rho1$ | -2.034 |

| | K1 | K2 | K3 | B1 | B2 | B3 |
|---|---|---|---|---|---|---|
| 1ST-SPEED | O | O | | O | | |
| 2ND-SPEED | O | O | | | O | |
| 3RD-SPEED | O | O | | | | O |
| 4TH-SPEED | O | O | O | | | |
| 5TH-SPEED | O | O | O | | | O |
| REAR | O | | | O | | O |

| | K1 | K2 | K3 | K4 | B1 | B2 | B3 |
|---|---|---|---|---|---|---|---|
| 1ST-SPEED | O | O | | | O | | |
| 2ND-SPEED | O | O | | | | O | |
| 3RD-SPEED | O | O | | | | | O |
| 4TH-SPEED | O | O | O | | | | |
| 5TH-SPEED | O | O | O | | | | O |
| REAR | O | | | | O | | O |
| REAR | O | | | O | | | O |

| | K2 | K3 | B1 | B2 | B3 |
|---|---|---|---|---|---|
| 1ST-SPEED | O | | O | | |
| 2ND-SPEED | O | | | O | |
| 3RD-SPEED | O | | | | O |
| 4TH-SPEED | O | O | | | |
| 5TH-SPEED | | O | | | O |
| REAR | | | O | | O |

| | K1 | K2 | K3 | K4 | B1 | B2 | B3 |
|---|---|---|---|---|---|---|---|
| 1ST-SPEED | O | O | | | O | | |
| 2ND-SPEED | O | O | | | | O | |
| 3RD-SPEED | O | O | | | | | O |
| 4TH-SPEED | O | O | O | | | | |
| 5TH-SPEED | O | | O | | | | O |
| REAR | O | | | | O | | O |
| REAR | O | | | O | | | O |

|  | K1 | K2 | K3 | K4 | B1 | B2 | B3 |
|---|---|---|---|---|---|---|---|
| 1ST-SPEED | O | O |  |  | O |  |  |
| 2ND-SPEED | O | O |  |  |  | O |  |
| 3RD-SPEED | O | O |  |  |  |  | O |
| 4TH-SPEED | O | O | O |  |  |  | O |
| 5TH-SPEED |  | O | O |  |  |  | O |
| REAR | O |  |  |  | O |  | O |
| REAR | O |  |  | O | O |  |  |

PLANETARY GEAR TRANSMISSION FOR MOTOR VEHICLE

| Inventor | Appln. No. |
| --- | --- |
| Asada et al | 07/439,607 |
| Asada | 07/439699 |
| Nakawaki et al | 07/460,998 |
| Asada | 07/437,838 |

The above commonly assigned applications have general related subject matter even though they claim different aspects of that general subject matter.

BACKGROUND OF THE INVENTION

1. Field of the Invention

The present invention relates to improvements in a planetary gear transmission disposed between an engine or motor and a drive wheel or wheels of a motor vehicle such as an automobile and a railway carriage.

2. Discussion of the Prior Art

Planetary gear type transmissions which have a plurality of automatically selected gear or speed positions are widely used for motor vehicles. An example of such a planetary gear transmission is disclosed in Publication Nos. 50-32913 and 51-3012 of examined Japanese patent applications, wherein a first, a second and a third planetary gear unit are disposed in series, so as to provide five forward-drive positions. This transmission has a comparatively simple construction, and provides a relatively wide range of speed reduction ratio. Further, the radial dimension of the transmission can be made comparatively small, while the gear ratios $\rho$ of the planetary gear units ($\rho$ = number of teeth of the sun gear divided by number of teeth of the ring gear) are held within a suitable range.

In the conventional planetary gear transmission as indicated above, however, a shifting from the 2nd-speed position to the 3rd-speed position or from the 1st-speed position to the 2nd-speed position requires disengagement of one clutch which has been placed in its engaged position, and engagement of another clutch which has been placed in its disengaged position. Since the disengagement and engagement of the two clutches take place substantially concurrently or within a very short time, it is difficult to adequately control the shifting operation. More specifically, the vehicle engine tends to race if there exists an excessively large time lapse between the moment at which one clutch has been disengaged and the moment at which another clutch has been engaged. On the other hand, simultaneous partial engagement of the two clutches may cause the transmission to be more or less locked, generating an undesirable shifting shock. Therefore, the frictional coupling devices such as the clutches should be adequately controlled to assure a smooth shifting operation of the transmission without such racing and locking phenomena of the engine and transmission. However, adequately controlling the disengagement and engagement of two clutches is difficult to attain.

The above problem is serious or conspicuous particularly when a shifting of the transmission is effected with the engine running at a relatively high speed, that is, when the shifting is associated with one of the 1st-speed, 2nd-speed and 3rd-speed positions which have relatively high speed reduction ratios (speed of the input member of the transmission divided by speed of the output member).

SUMMARY OF THE INVENTION

The present invention was developed to solve the above problem experienced in the prior art. It is accordingly an object of the present invention to provide a planetary gear transmission which is shifted without disengagement of one clutch and substantial concurrent engagement of another clutch.

The above object may be achieved according to the principle of the present invention, which provides a planetary gear transmission for a motor vehicle, including an input member, an output member, a first single-pinion type planetary gear unit having a first sun gear, a first planetary gear meshing with the first sun gear, a first ring gear meshing with the first planetary gear and a first carrier rotatably supporting the first planetary gear, a second single-pinion type planetary gear unit having a second sun gear, a second planetary gear meshing with the second sun gear, a second ring gear meshing with the second planetary gear and a second carrier rotatably supporting the second planetary gear, and a third double-pinion type planetary gear unit having a third sun gear, at least one pair of third planetary gears which mesh with each other and one of which meshes with the third sun gear, a third ring gear meshing with the other of the at least one pair of third planetary gears, and a third carrier rotatably supporting the at least one pair of third planetary gears, the first, second and third planetary gear units being disposed coaxially with each other in the order of description, for transmitting power from the input member to the output member, at a selected one of different speed reduction ratios, the planetary gear transmission being characterized in that the first and second sun gears are fixed to each other, or connectable to each other by a coupling device; that the first carrier and the second ring gear are fixed to each other, or connectable to each other by a coupling device; that the first and third ring gears are fixed to each other, or connectable to each other by a coupling device; and that the second and third carriers are fixed to each other, or connectable to each other by a coupling device.

Where the two elements of each combination indicated above are fixed to each other, these two elements may be separate members secured to each other by a suitable method. Alternatively, the two elements may be formed as a single integral member which attains two functions corresponding to the two elements. In the latter case, too, the two elements are interpreted to be fixed to each other by fixing means, according to the principle of the invention. The coupling device indicated above may be a clutch which is engaged for connecting the appropriate two elements indicated above.

In the planetary gear transmission of the present invention constructed as described above, suitable coupling devices such as clutches and brakes which include the above-indicated coupling device may be suitably disposed in association with the appropriate elements of the three planetary gear units, so that the transmission may be shifted up and down from one position providing one speed reduction ratio to another position providing another speed reduction ratio, without disengagement of one clutch and substantially concurrent engagement of another clutch, thereby eliminating the conventionally experienced racing of the vehicle engine and/or locking cf the transmission. Thus, the present transmission can be smoothly shifted, with improved ease of control of timing for activating and de-activating the appropriate coupling devices.

In one form of the invention, a coupling device such as a clutch is provided between the second and third carriers for connecting these two elements when needed. In another form of the invention, a coupling device is provided for connecting the first and second sun gears. According to a further form of the invention, a coupling device is provided for connecting the first carrier and the second ring gear and second sun gears.

BRIEF DESCRIPTION OF THE DRAWINGS

The above and optional objects, features and advantages of the present invention will become more apparent by reading the following detailed description of presently preferred embodiments of the invention, when considered in conjunction with the accompanying drawings, in which.

DETAILED DESCRIPTION OF THE PREFERRED EMBODIMENTS

Figure 1A:
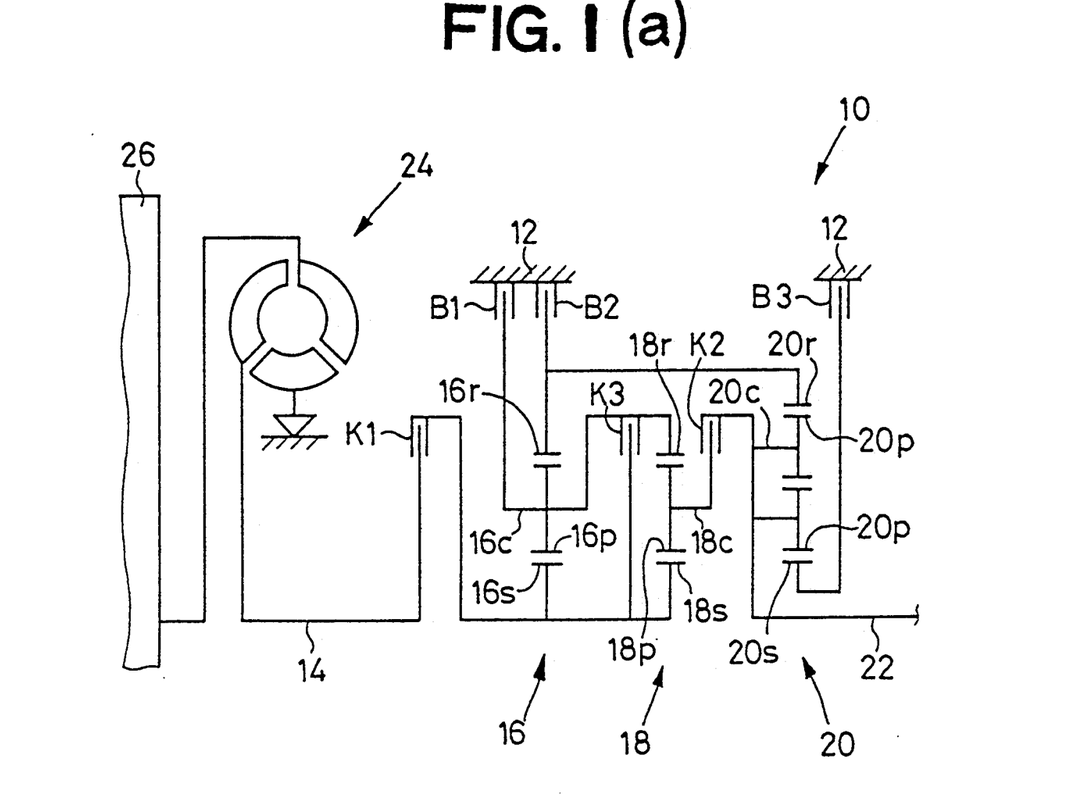
FIG. 1(a) is a schematic view illustrating a part of a vehicle power transmitting system which incorporates one embodiment of a planetary gear transmission of the present invention.

Referring first to FIG. 1(a), reference numeral 10 generally denotes a planetary gear type transmission for a motor vehicle (hereinafter referred to as "planetary gear transmission" or simply as "transmission", where appropriate). The planetary gear transmission 10 has an input shaft 14, a first planetary gear unit 16, a second planetary gear unit 18, a third planetary gear unit 20, and an output shaft 22. These elements 14, 16, 18, 20, 22 are all disposed in the order of description, within a transmission casing 12 attached to the body of the vehicle, such that all the elements are aligned with a common axis, i.e., axis of rotation of the transmission 10.

The input shaft 14 is connected to an engine 26 of the vehicle via a torque converter 24 disposed therebetween, while the output shaft 22 is connected to drive wheels of the vehicle via a differential gear device as well known in the art. The input and output shafts 14, 22 serve as input and output members of the transmission 10. Since each of the transmission 10 and the torque converter 24 is constructed symmetrically with respect to their axes of rotation, only the upper halves of the transmission and torque converter are shown in FIG. 1(a), in the interest of brevity and simplification.

Each of the coaxially disposed first and second planetary gear units 16, 18 is a well known single-pinion type planetary gear assembly. The first planetary gear unit 16 has a first sun gear 16s, a first planetary gear 16p, a first carrier 16c, and a first ring gear 16r. The first planetary gear 16p is rotatably supported by the first carrier 16c and is disposed between and meshes with the first sun gear and ring gear 16s, 16r. The second planetary gear unit 18 has a second sun gear 18s, a second planetary gear 18p, a second carrier 18c and a second ring gear 18r. The second planetary gear 18p is rotatably supported by the second carrier 18c and is disposed between and meshes with the second sun gear and ring gear 18s, 18r.

The third planetary gear unit 20 is a double-pinion type planetary gear assembly, which includes a third sun gear 20s, a pair of third planetary gears 20p which mesh with each other, a third carrier 20c and a third ring gear 20r. The third planetary gear unit 20 may includes two or more pairs of third planetary gears 20p. The pair of third planetary gears 20p are rotatably supported by the third carrier 20c and are disposed between the third sun gear and ring gear 20s, 20r. One of the two third planetary gears 20p meshes with the third sun gear 20s, while the other gear 20p meshes with the third ring gear 20r.

In the planetary gear transmission 10, the first and second sun gears 16s and 18s are fixed to each other for rotation as a unit, while the first carrier 16c and the second ring gear 18r are fixed to each other for rotation as a unit. Further, the first and third ring gears 16r, 20r are fixed to each other for rotation as a unit, while the third carrier 20c and the output shaft 22 are connected to each other for rotation as a unit. The transmission 10 incorporates a first clutch K1, a second clutch K2, a third clutch K3, a first brake B1, a second brake B2 and a third brake B3. The first clutch K1 is engaged for connecting the first and second sun gears 16s, 18s to the input shaft 14. The second clutch K2 is engaged for connecting the second carrier 18c to the third carrier 20c and the output shaft 22. The third clutch K3 is engaged for connecting the first and second sun gears 16s, 18s to the first carrier 16c and the second ring gear 18r. The first brake B1 is engaged for fixing the first carrier 16c and the second ring gear 18r to the transmission casing 12. The second brake B2 is engaged for fixing the first and third ring gears 16r, 20r to the transmission casing 12, while the third brake B3 is engaged for fixing the third sun gear 20s to the transmission casing 12. It will be understood that the second and third carriers 18c, 20c are connectable to each other by a coupling device in the form of the second clutch K2.

Each of the first, second and third clutches K1, K2, K3, and the first, second and third brakes B1, B2, B3 may be a hydraulically operated one that is used in a conventional automatic transmission for a motor vehicle. The clutches K1, K2, K3 may use multiple-disk type clutches or one-way clutches, and the brakes B1, B2, B3 may use a single brake band, or two brake bands wound in the opposite directions.

Suitable connecting means is provided as required, between the first clutch K1 and the input shaft 14, between the first clutch K1 and the first sun gear 16s, between the second clutch K2 and the second carrier 18c, between the second clutch K2 and the third carrier 20c, between the third clutch K3 and the first and second sun gears 16s, 18s, and between the third clutch K3 and the first carrier 16c and second ring gear 18r. Similarly, suitable connecting means is provided as required, between the first brake B1 and the first carrier 16c, between the second brake B2 and the first and third ring gears 16r, 20r, between the third brake B3 and the third sun gear 20s, between the elements of each planetary gear units 16, 18, 20, and between the third carrier 20c and the output shaft 22.

Figure 1B:
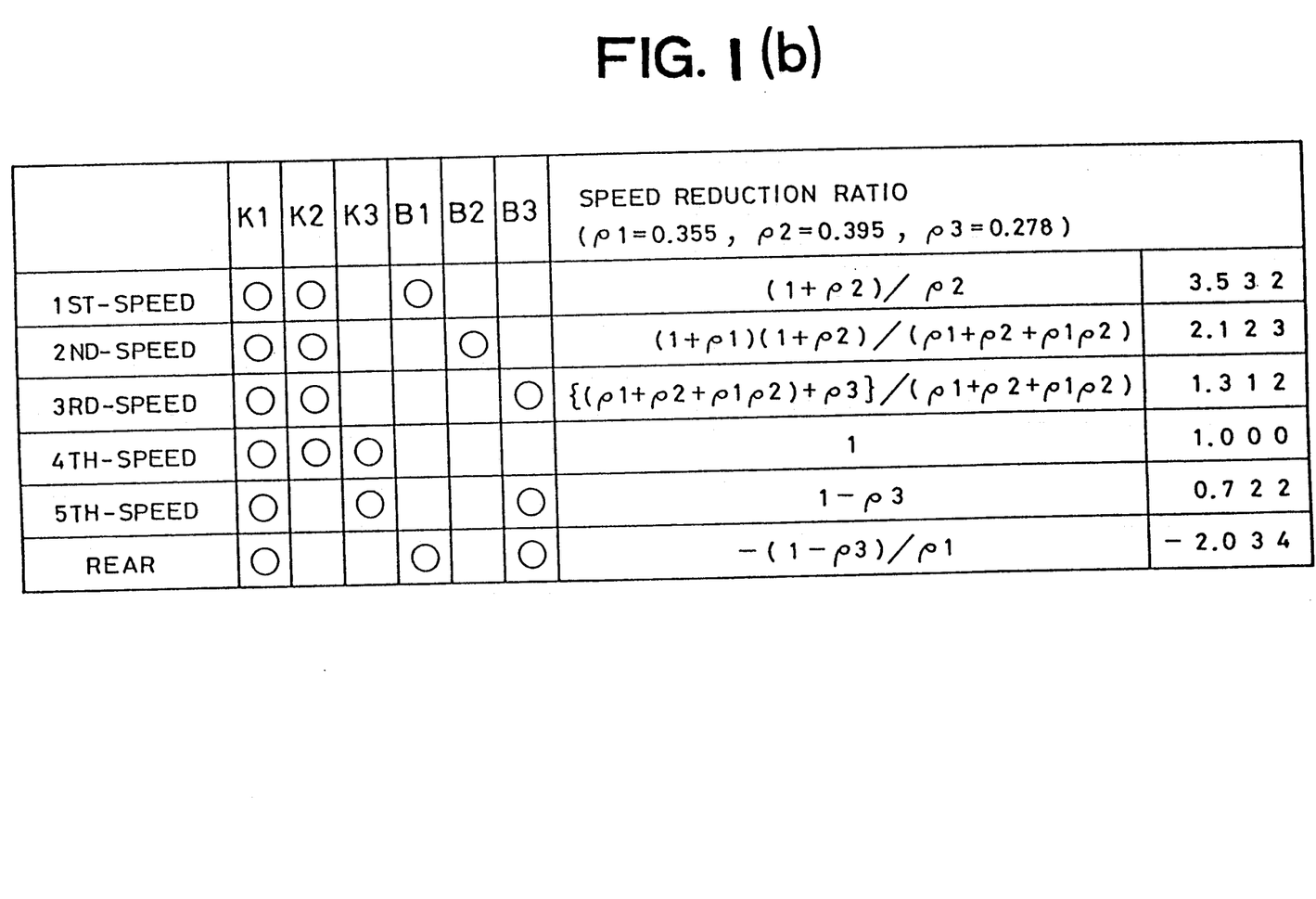
FIG. 1(b) is a view showing operating positions of the transmission of FIG. 1(a), and on-off states of clutches and brakes of the transmission to establish the positions of the transmission.

As indicated in the table of FIG. 1(b), the present planetary gear transmission 10 constructed as described above has six operating positions, i.e., five forward-drive positions (1st-speed, 2nd-speed, 3rd-speed, 4th-speed and 5th-speed positions), and one rear drive position. These six positions are selectively established by simultaneous engagement of three frictional coupling devices selected from the first, second and third clutches K1-K3 and the first, second and third brakes B1-B3. In the table, the engaged clutches and brakes are indicated by "o" marks. In the present embodiment, the first, second and third planetary gear units 16, 18, 20 have respective gear ratios $\rho_1 = 0.355$, $\rho_2 = 0.395$ and $\rho_3 = 0.278$. The table of FIG. 1(b) indicates the speed reduction ratios (speed of the input shaft 14/speed of the output shaft 22) of the six operating positions of the transmission 10.

The following equation (1) is satisfied with respect to the first and second single-pinion type planetary gear units 16, 18, while the following equation (2) is satisfied with respect to the third double-pinion type planetary gear unit 20:

$$Nr = (1+\rho)Nc - \rho Ns \quad (1)$$

$$Nr = (1-\rho)Nc + \rho Ns \quad (2)$$

where,
Nr: Rotating speed of the ring gears 16r, 18r, 20r
Nc: Rotating speed of the carriers 16c, 18c, 20c
Ns: Rotating speed of the sun gears 16s, 18s, 20s
$\rho$: Gear ratios of the gear units 16, 18, 20

The speed reduction ratios of the six operating positions of the transmission 10 are obtained from the above equations (1) and (2).

The gear ratios $\rho_1$, $\rho_2$, $\rho_3$ of the planetary gear units 16, 18, 20 indicated above are determined as follows:

$\rho_1 = Z_{1s}/Z_{1r}$ $\rho_2 = Z_{2s}/Z_{2r}$ $\rho_3 = Z_{3s}/Z_{3r}$ where,
$Z_{1s}$: Number of teeth of the first sun gear 16s
$Z_{1r}$: Number of teeth of the first ring gear 16r
$Z_{2s}$: Number of teeth of the second sun gear 18s
$Z_{2r}$: Number of teeth of the second ring gear 18r
$Z_{3s}$: Number of teeth of the third sun gear 20s
$Z_{3r}$: Number of teeth of the third ring gear 20r There will be described each of the six operating positions of the planetary gear transmission 10.

The 1st-speed position of the transmission 10 is established or selected by concurrent engagement of the first and second clutches K1, K2 and the first brake B1, which results in concurrent connections between the input shaft 14 and the first and second sun gears 16s, 18s, between the second carrier 18c and the third carrier 20c and output shaft 22, and between the first carrier 16c and second ring gear 18r and the transmission casing 12. In the 1st-speed position, power is transmitted from the input shaft 14 to the output shaft 22 such that the output shaft 22 is rotated in the same direction as the input shaft 14, i.e., in the forward direction, at the speed reduction ratio of $(1+\rho_2)/\rho_2$.

The 2nd-speed position of the transmission 10 is established by concurrent engagement of the first and second clutches K1, K2 and the second brake B2, which results in concurrent connections between the input shaft 14 and the first and second sun gears 16s, 18s, between the second carrier 18c and the third carrier 20c and output shaft 22, and between the first and third ring gears 16r, 20r and the transmission casing 12. In this 2nd-speed position, the output shaft 22 is rotated in the same direction as the input shaft 14, i.e., in the forward direction, at the speed reduction ratio of $(1+\rho_1)(1+\rho_2)/(\rho_1+\rho_2+\rho_1\rho_2)$.

The 3rd-speed position of the transmission 10 is established by concurrent engagement of the first and second clutches K1, K2 and the third brake B3, which results in concurrent connections between the input shaft 14 and the first and second sun gears 16s, 18s, between the second carrier 18c and the third carrier 20c and output shaft 22, and between the third sun gear 20s and the transmission casing 12. In this 3rd-speed position, the output shaft 22 is rotated in the same forward direction as the input shaft 14, at the speed reduction ratio of $\{(\rho_1+\rho_2+\rho_1\rho_2)-\rho_3\}/(\rho_1+\rho_2+\rho_1\rho_2)$.

The 4th-speed position of the transmission 10 is established by concurrent engagement of the first, second and third clutches K1, K2 and K3, which results in concurrent connections between the input shaft 14 and the first and second sun gears 16s, 18s, between the second carrier 18c and the third carrier 20c and output shaft 22, and between the first and second sun gears 16s, 18s and the first carrier 16c and second ring gear 18r. In this 4th-speed position, the first, second and third planetary gear units 16, 18, 20 are rotated with the input shaft 14, and the output shaft 22 is rotated in the same forward direction as the input shaft 14, at the speed reduction ratio of 1.

The 5th-speed position is established by concurrent engagement of the first and third clutches K1, K3 and the third brake B3, which results in concurrent connections between the input shaft 14 and the first and second sun gears 16s, 18s, between the first and second sun gears 16s, 18s and the first carrier 16c and second ring gear 18r, and between the third sun gear 20s and the transmission casing 12. In this 5th-speed position, the output shaft 22 is rotated in the same forward direction as the input shaft 14, at the speed reduction ratio of $1-\rho_3$.

The rear drive position of the transmission 10 is established by concurrent engagement of the first clutch K1 and the first and third brakes 11, B3, which results in concurrent connections between the input shaft 14 and the first and second sun gears 16s, 18s, between the first carrier 16c and second ring gear 18r and the transmission casing 12, and between the third sun gear 20s and the transmission casing 12. In this rear drive position, the output shaft 22 is rotated in the reverse direction opposite to the forward direction of rotation of the input shaft 14, at the speed reduction ratio of $-(1-\rho_3)/\rho_1$.

The present planetary gear transmission 10 is comparatively simple in construction since the two single-pinion planetary gear units 16, 18 and the one double-pinion planetary gear unit 20 are coaxially disposed with each other. Further, the selective activation or engagement of the six coupling devices selected from among the three clutches K1, K2, K3 and three brakes B1, B2, B3 provides the five forward drive positions and the one rear drive position, permitting power transmission from the input shaft 14 to the output shaft 22, over a sufficiently wide range of speed reduction ratio. Accordingly, the instant transmission 10 permits not only a high-speed running of the vehicle but also a high degree of acceleration performance or drivability and high-power uphill running. The relatively large number of drive positions of the transmission 10 eliminates unnecessary increase in the running speed of the engine 26 or racing of the engine, and improves fuel economy and noise-free running of the vehicle.

Further, any shifting operation of the transmission 10 from one of the five forward-drive positions to the adjacent forward-drive position does not require disengagement of one of the three clutches K1-K3 and engagement of another clutch. Consequently, the transmission 10 can be smoothly and easily shifted up and down, without racing of the engine 26 and locking of the transmission. All of the six operating positions of the transmission 10 are established by concurrent engagement of the respective combinations of the three coupling devices selected from among the six clutches and brakes K1-K3, B1-B3. All shifting operations are effected by disengaging one of the three engaged coupling devices and engaging one of the three disengaged coupling devices. However, any shifting motion requires disengagement and engagement of any two clutches.

In the present transmission 10, the first clutch K1 is disposed between the input shaft 14 and the first and second sun gears 16s, 18s, for selective connection and disconnection between the input shaft 14 and the sun gears 16s, 18s. The provision of this clutch K1 assures reduced fuel consumption and noise-free operation of the engine 26.

Further, the gear ratios $\rho_1$, $\rho_2$ and $\rho_3$ of the planetary gear units 16, 18, 20 are held within a suitable range so that the speed reduction ratios provided by the 1st-speed position through the 4th-speed position are suitably set so as to change almost in the manner of geometric progression, depending upon the characteristics of the engine 26. This means that the transmission 10 exhibits improved power transmitting characteristics over a wide range of running speed of the vehicle, while the transmission is constructed relatively compact and small-sized.

In the present transmission 10, the relative rotating speeds of the planetary gears 16p, 18p, 20p with respect to the carriers 16c, 18c, 20c are comparatively low. This contributes to improvement in the durability of the bearings used for the planetary gear units 16, 18, 20.

Moreover, the transmission 10 having the 5th-speed position whose speed reduction ratio is 0.722 permits economical, noise-free high-speed running of the vehicle, as well as powerful acceleration of the vehicle.

According to the present transmission 10, a propeller shaft may be connected directly to the output shaft 22 which is connected to one of opposite axial ends of the transmission remote from the engine 22. This arrangement is suitable for a front-engine rear-drive vehicle. However, the output shaft 22 may be replaced by an output gear adapted for operative connection with front drive wheels of a front-engine front-drive vehicle.

It is noted that the first and second sun gears 16s, 18s are fixed to each other for rotation as a unit. For example, these sun gears may be provided by a single member in the form of a long pinion which has long teeth. This contributes to reduction in the number of component parts, number of manufacturing and assembling steps of the parts, and axial dimension of the transmission.

There will be described various modified embodiments of the present invention, wherein the same reference numerals as used in the first embodiment will be used to identify the functionally corresponding components. In the interest of brevity, redundant description of these components will not be provided.

Figures 2A, 2B:
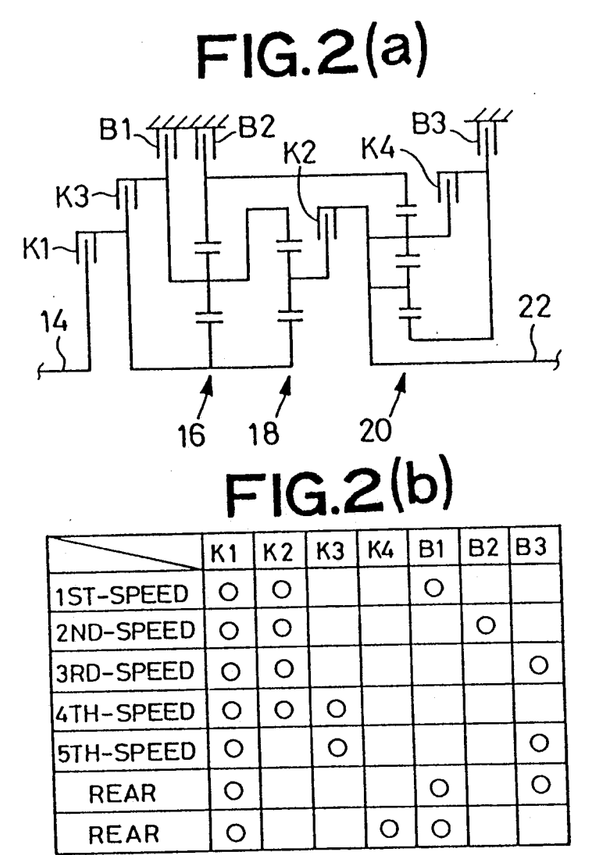
FIGS. 2(a), 3(a), 4(a), 5(a), 6(a), 7(a), 8(a), 9(a), 10(a), 11(a), 12(a), 13(a), 14(a), 15(a), 16(a), 17(a) and 18(a) are schematic views corresponding to that of FIG. 1(a), showing various other embodiments of the invention.
FIGS. 2(b), 3(b), 4(b), 5(b), 6(b), 7(b), 8(b), 9(b), 10(b), 11(b), 12(b), 13(b), 14(b), 15(b), 16(b), 17(b) and 18(b) are views showing operating positions of the transmissions of the embodiments of FIGS. 2(a), 3(a), 4(a), 5(a), 6(a), 7(a), 8(a), 9(a), 10(a), 11(a), 12(a), 13(a), 14(a), 15(a), 16(a), 17(a) and 18(a), respectively, and on-off states of clutches and brakes of the respective transmissions.

Referring to FIG. 2(a), a planetary gear transmission shown therein has an additional fourth clutch K4, which is engaged for connecting the third sun gear 20s to the third carrier 20c and output shaft 22. As indicated by "o" marks in the table of FIG. 2(b), a total of five forward-drive positions and two rear-drive positions are established by concurrent engagement of three coupling devices selected from among the four clutches K1-K4 and the three brakes B1-B3. In this embodiment, the third clutch K3 is disposed outside the first planetary gear unit 16.

Figures 3A, 3B:
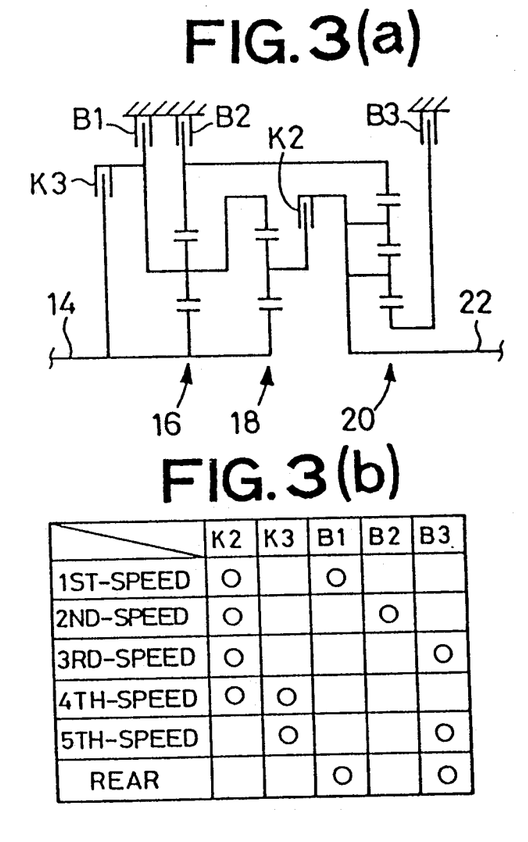

A planetary gear transmission shown in FIG. 3(a) does not have the first clutch K1 provided in the embodiments of FIGS. 1(a) and 2(a). In this embodiment of FIG. 3(a), the first and second sun gears 16s, 18s are fixed to the input shaft 14, for rotation with the input shaft. As indicated by "o" marks in the table of FIG. 3(b), five forward-drive positions and one rear-drive position are established by concurrent engagement of two coupling devices selected from among the two clutches K2, K3 and the three brakes B1-B3. In this embodiment, too, the third clutch K3 is disposed outside the first planetary gear unit 16.

Figure 4A:
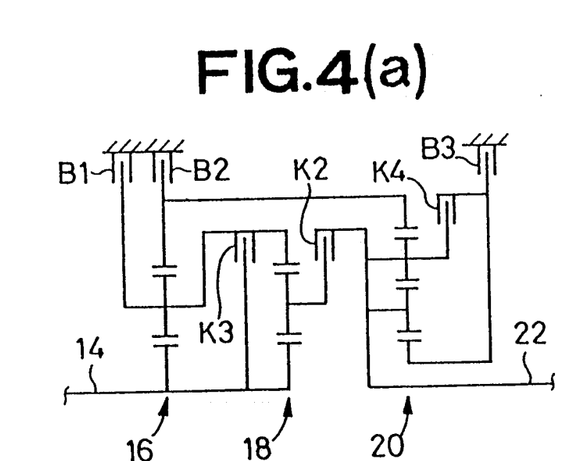
Figure 4B:
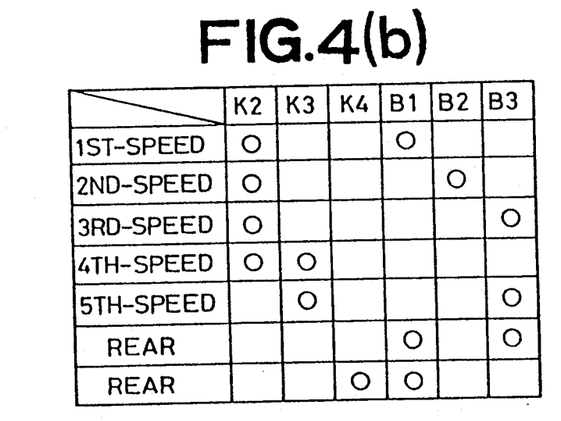

Referring to FIG. 4(a), a planetary gear transmission shown therein is a modification of the transmission of FIG. 3(a), which has a fourth clutch K4 for connecting the third sun gear 20s to the third carrier 20c and output shaft 22. As indicated by "o" marks in FIG. 4(b), five forward-drive positions and two rear-drive positions are established by concurrent two coupling devices selected from among the three clutches K2-K4 and the three brakes B1-B3. In this embodiment, the third clutch K3 is disposed between the first and second planetary gear units 16, 18.

Figure 5A:
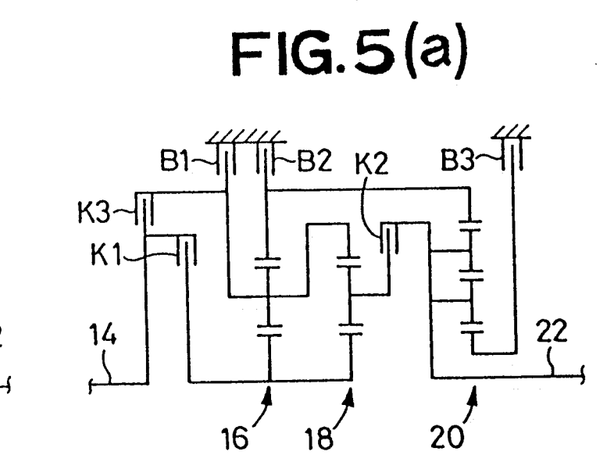
Figure 5B:
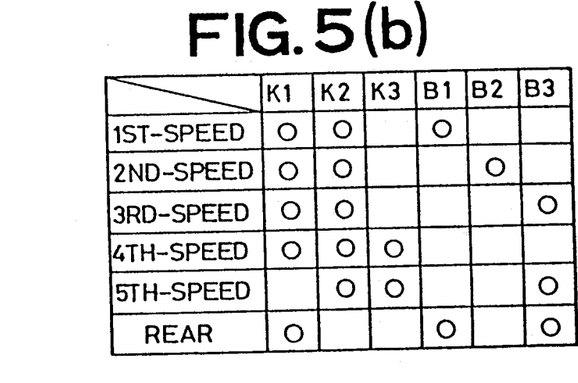

A planetary gear transmission shown in FIG. 5(a) is a modification of the transmission of FIG. 1(a), in which the clutch K3 is provided for connecting the first carrier 16c and second ring gear 18r to the input shaft 14. As indicated by "o" marks in FIG. 5(b), five forward-drive positions and one rear-drive position are established by concurrent three coupling devices selected from among the three clutches K1-K3 and the three brakes B1-B3.

Figure 6A:
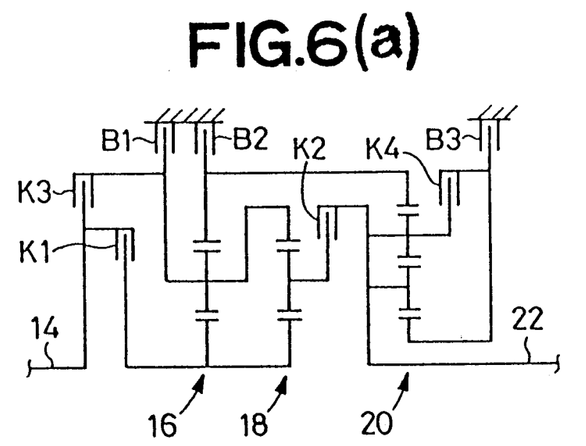
Figure 6B:
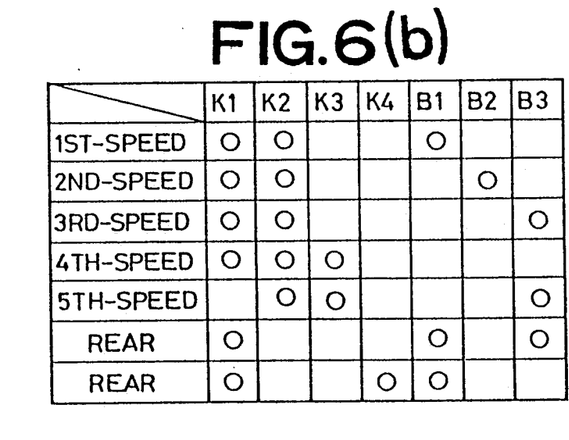

A planetary gear transmission shown in FIG. 6(a) is a modification of the transmission of FIG. 5(a), in which a fourth clutch K4 is provided for connecting the third sun gear 20s to the third carrier 20c and output shaft 22. As indicated in FIG. 6(b), five forward-drive positions and two rear-drive positions are established by concurrent activation of three coupling devices selected from among the four clutches K1-K4 and the three brakes B1-B3.

Figure 7A:
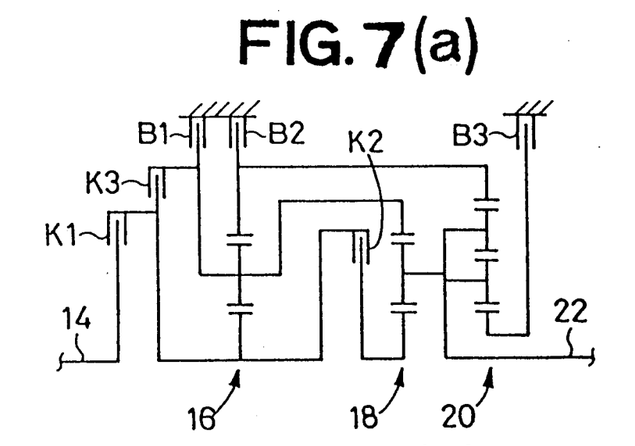
Figure 7B:
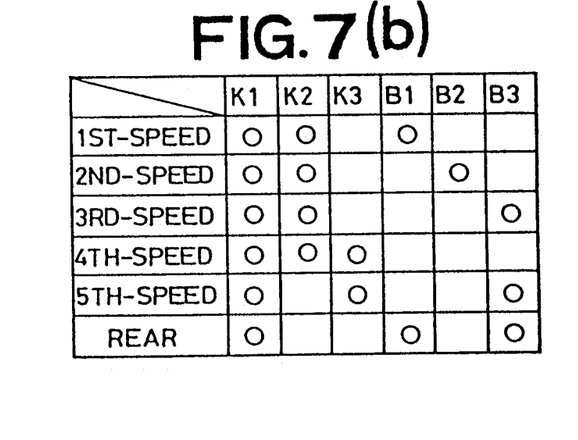

By reference to FIG. 7(a), there is shown a further embodiment of the invention, which is a modification of the embodiment of FIG. 1(a), wherein the second carrier 18c is fixed to the third carrier 20c and output shaft 22, while the second clutch K2 is provided for connecting the first and second sun gears 16s, 18s. As indicated in FIG. 7(b), five forward-drive positions and one rear-drive position are established by concurrent engagement of three coupling devices selected from the three clutches K1-K3 and the three brakes B1-B3. It will be understood that the first and second sun gears 16s, 18s are connectable to each other by means of a coupling device in the form of the second clutch K2. In this embodiment, the third clutch K3 is disposed outside the first planetary gear device 16.

Figure 8A:
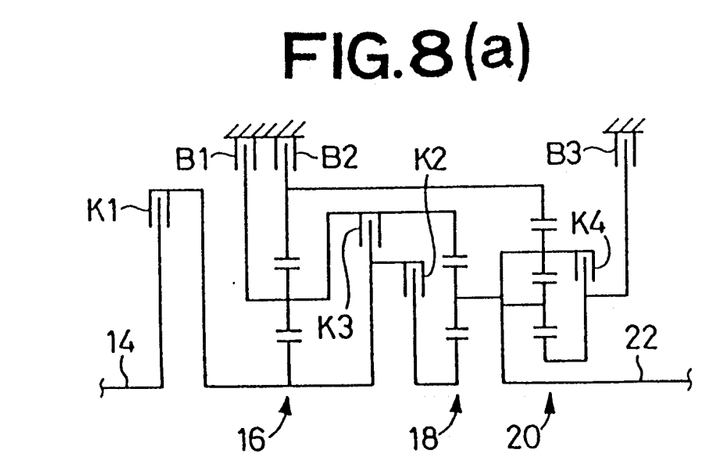
Figure 8B:
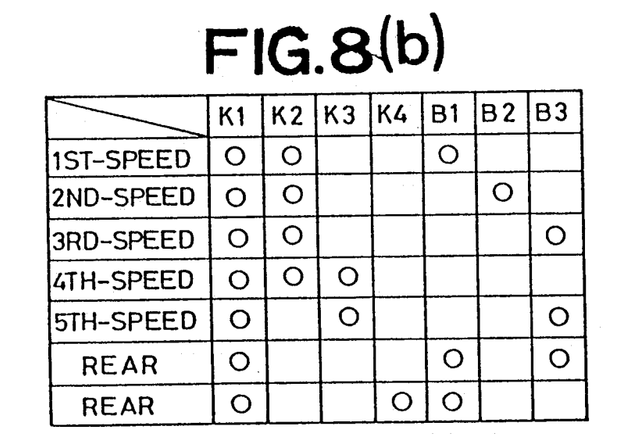

A modification of the transmission of FIG. 7(a) is illustrated in FIG. 8(a), wherein a fourth clutch K4 is provided for connecting the third sun gear 20s to the third carrier 20c and output shaft 22. As indicated in FIG. 8(b), five forward-drive positions and two rear-drive positions are established by concurrent engagement of three coupling devices selected from the four clutches K1-K4 and the three brakes B1-B3. In this transmission, the third clutch K3 is disposed between the first and second planetary gear units 16, 18.

Figure 9A:
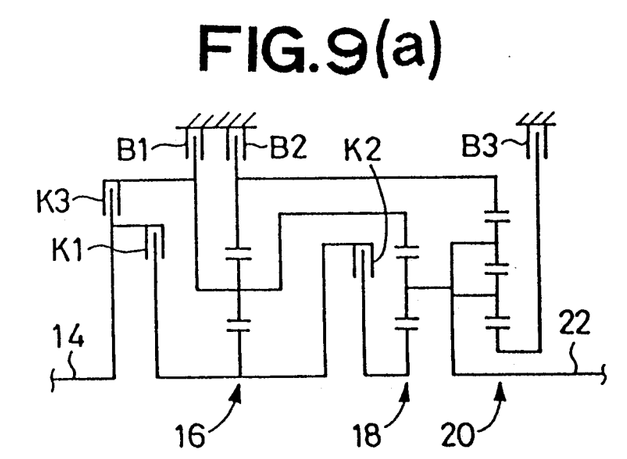
Figure 9B:
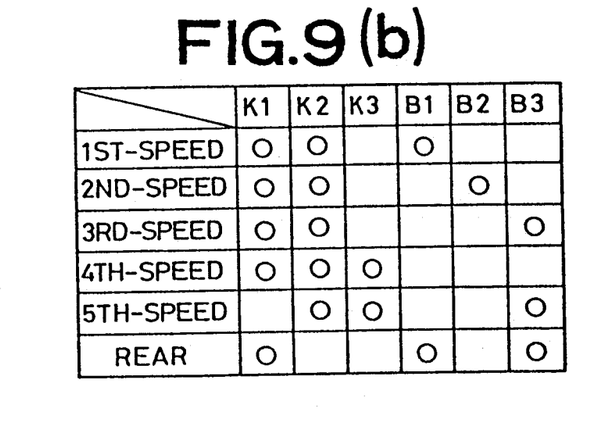

Another modification of the transmission of FIG. 7(a) is illustrated in FIG. 9(a), wherein the third clutch K3 is adapted to connect the first carrier 16c and second ring gear 18r to the input shaft 14. As indicated by "o" marks in FIG. 9(b), five forward-drive positions and one rear-drive position are established by concurrent engagement of three coupling devices selected from among the three clutches K1-K3 and the three brakes B1-B3.

Figure 10A:
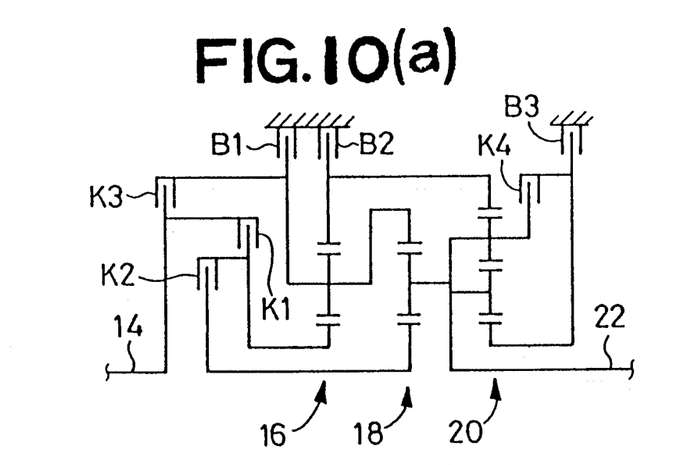
Figure 10B:
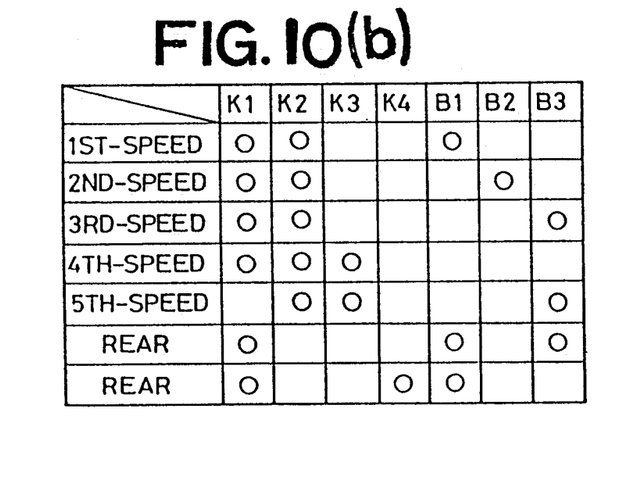

Referring to FIG. 10(a), there is shown a modification of the transmission of FIG. 9(a), wherein a fourth clutch K4 is provided for connecting the third sun gear 20s and third carrier 20c to the output shaft 22. As indicated in FIG. 10(b), five forward-drive positions and two rear-drive positions are established by concurrent engagement of two coupling devices selected from among the four clutches K1-K4 and the three brakes B1-B3. In this embodiment, the second clutch K2 is disposed outside the first planetary gear unit 16.

Figure 11A:
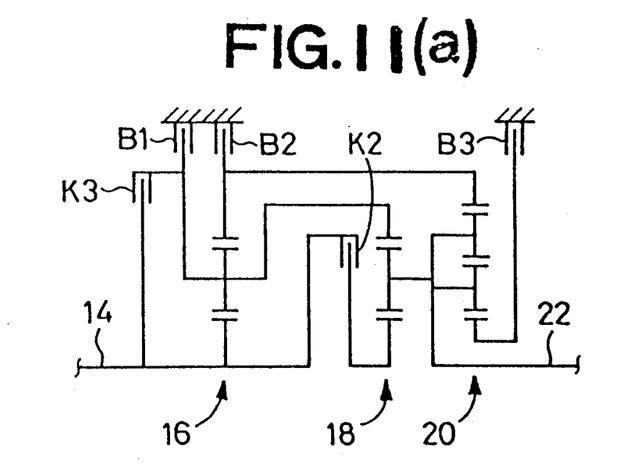
Figure 11B:
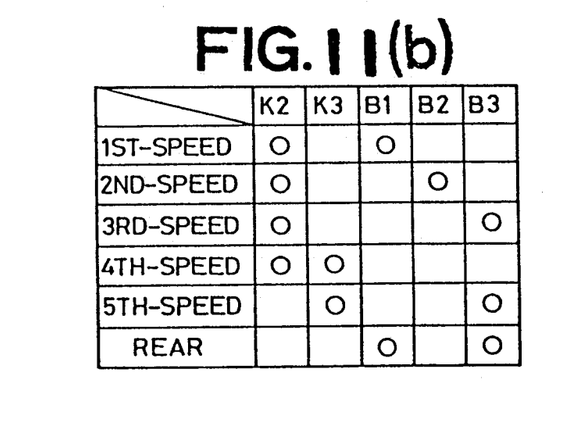

Another modification of the transmission of FIG. 9(a) is shown in FIG. 11(a), wherein the first clutch K1 is eliminated, while the first sun gear 16s and the input shaft 14 are fixed to each other for rotation as a unit. As indicated in FIG. 11(b), five forward-drive positions and one rear-drive position are established by concurrent engagement of two coupling devices selected from the two clutches K2, K3 and the three brakes B1-B3.

Figure 12A:
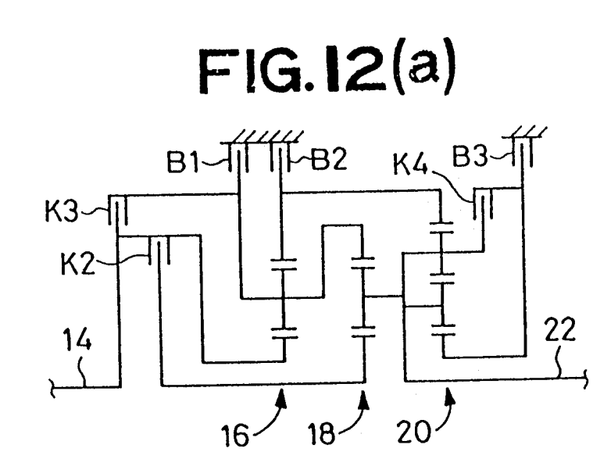
Figure 12B:
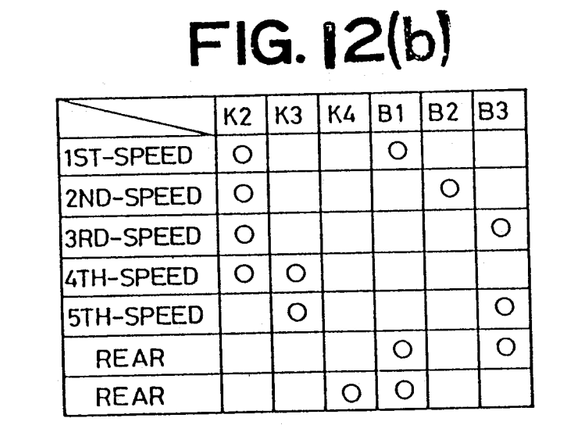

By reference to FIG. 12(a), there is illustrated a modification of the embodiment of FIG. 11(a), wherein a fourth clutch K4 is provided for connecting the third sun gear 20s to the third carrier 20c and output shaft 22. As indicated in FIG. 12(b), five forward-drive positions and two rear-drive positions are established by concurrent engagement of two coupling devices selected from among the three clutches K2-K4 and the three brakes B1-B3. In this embodiment, the second clutch K2 is disposed outside the first planetary gear unit 16.

Figure 13A:
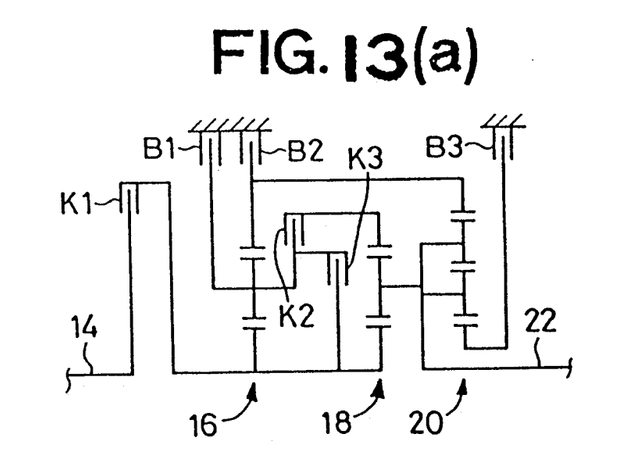
Figure 13B:
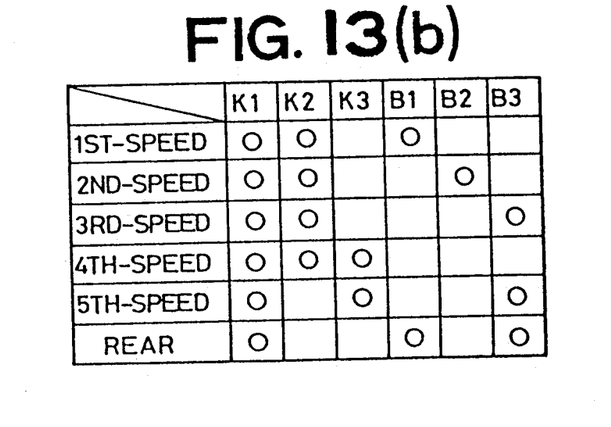

A planetary gear transmission shown in FIG. 13(a) is a modification of the transmission of FIG. 1(a), wherein the second clutch K2 is adapted to connect the first carrier 16c and the second ring gear 18r, while the third clutch K3 is adapted to connect only the first carrier 16c to the first and second sun gears 16s, 18s. As indicated in FIG. 13(b), five forward-drive positions and one rear-drive position are established by concurrent engagement of three coupling devices selected from among the three clutches K1-K3 and the three brakes B1-B3. In this embodiment, the first carrier 16c and the second ring gear 18r are connectable to each other by a coupling device in the form of the second clutch K2.

Figure 14A:
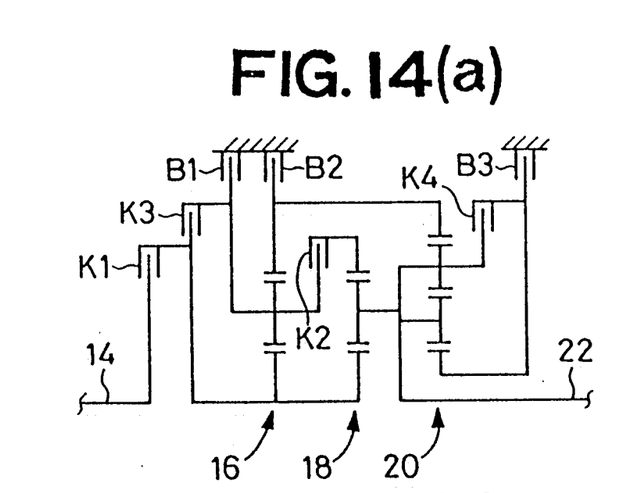
Figure 14B:
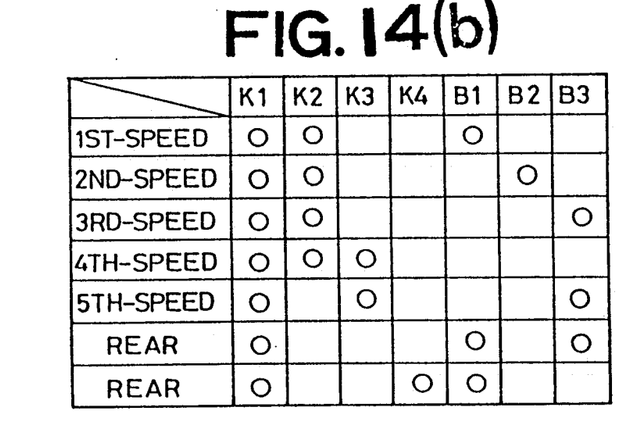

Referring to FIG. 14(a), there is shown a modification of the embodiment of FIG. 13(a), wherein a fourth clutch K4 is provided for connecting the third sun gear 20s to the third carrier 20c and output shaft 22. As indicated in FIG. 14(b), five forward-drive positions and two rear-drive positions are established by concurrent engagement of three coupling devices selected from among the four clutches K1-K4 and the three brakes B1-B3. In this embodiment, the third clutch K3 is disposed outside the first planetary gear unit 16.

Figure 15A:
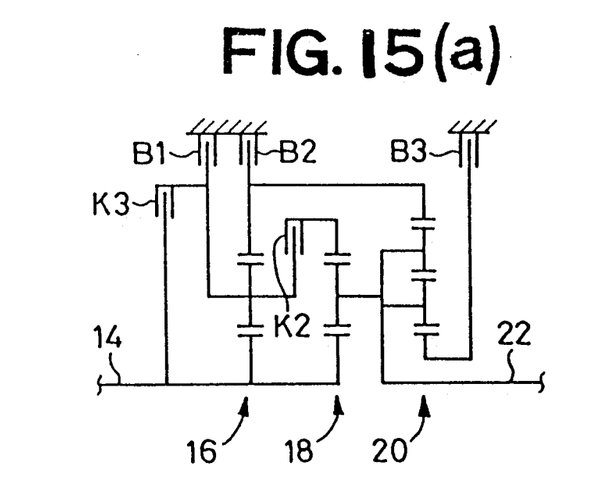
Figure 15B:
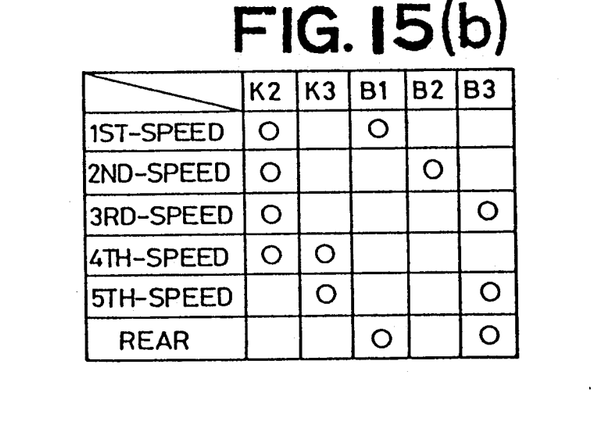

Another modification of the embodiment of FIG. 13(a) is shown in FIG. 15(a), wherein the clutch K1 is eliminated, and the first and second sun gears 16s, 18s are fixed to the input shaft 14 for rotation with the input shaft. As indicated in FIG. 15(a), five forward-drive positions and one rear-drive position are established by concurrent engagement of two coupling devices selected from among the two clutches K2, K3 and the three brakes B1-B3. In this embodiment, too, the third clutch K3 is disposed outside the first planetary gear unit 16.

Figure 16A:
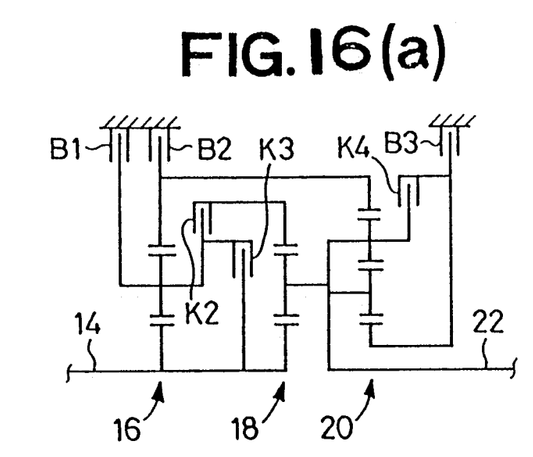
Figure 16B:
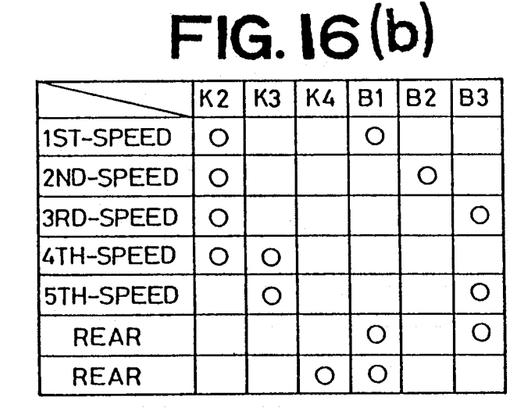

Referring to FIG. 16(a), there is illustrated a modification of the transmission of FIG. 15(a), wherein a fourth clutch K4 is provided for connecting the third sun gear 20s to the third carrier 20c and output shaft. As indicated in FIG. 16(b), five forward-drive positions and two rear-drive positions are established by concurrent engagement of two coupling devices selected from among the three clutches K2-K4 and the three brakes B1-B3. In the present embodiment, the third clutch K3 is disposed between the first and second planetary gear units 16, 18.

Figure 17A:
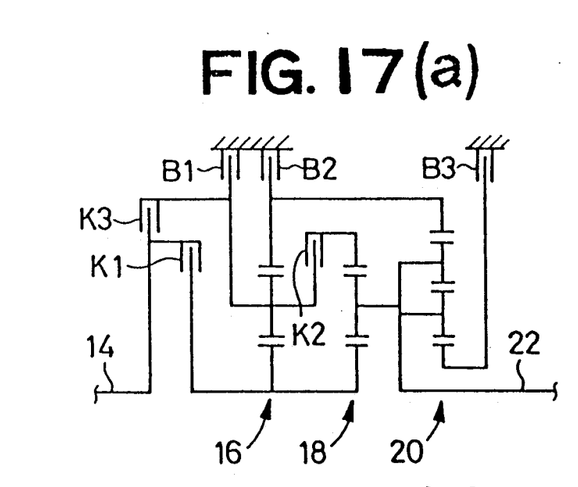
Figure 17B:
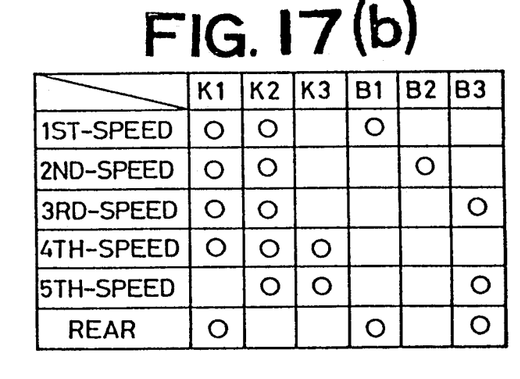

Referring to FIG. 17(a), there is illustrated a modification of the transmission of FIG. 13(a), wherein the third clutch K3 is adapted to connect the first carrier 16c to the input shaft 14. As indicated in FIG. 17(b), five forward-drive positions and one rear-drive position are established by concurrent engagement of three coupling devices selected from among the three clutches K1-K3 and the three brakes B1-B3.

Figure 18A:
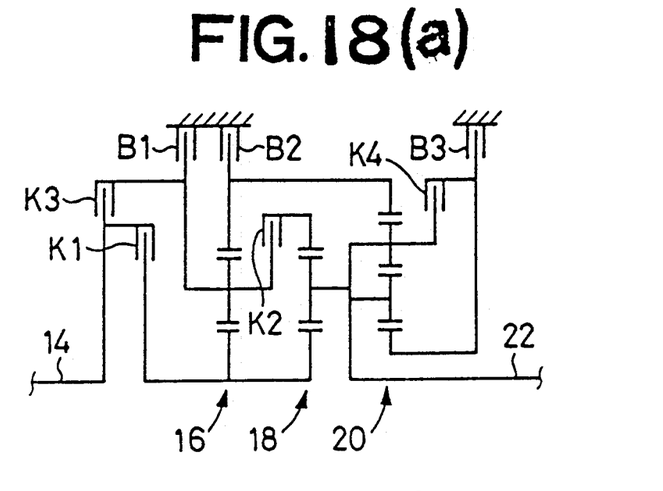
Figure 18B:
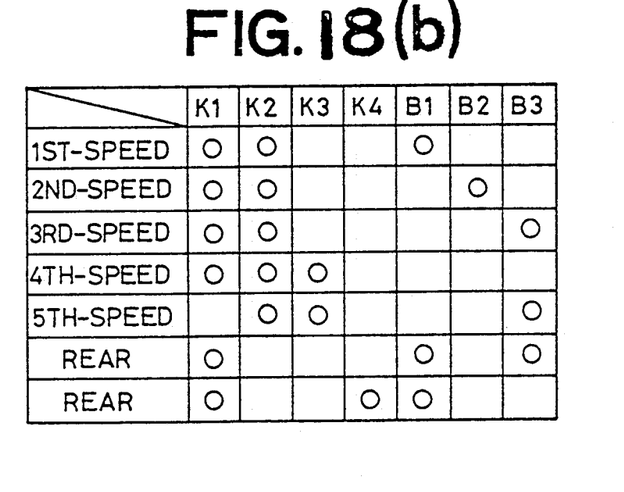

A modification of the transmission of FIG. 17(a) is shown in FIG. 18(a), wherein a fourth clutch K4 is provided for connecting the third sun gear 20s to the third carrier 20c and output shaft 22. As indicated in FIG. 18(b), five forward-drive positions and two rear-drive positions are established by concurrent engagement of three coupling devices selected from among the four clutches K1-K4 and the three brakes B1-B3.

Each of the clutches K1, K2, K3, K4 and brakes B1, B2 and B3 used in the various embodiments discussed above is provided by a multiple-disk clutch with or without a one-way clutch or clutches, or a brake band or bands with a drum. Typical examples of arrangements incorporating these clutches and brake bands are illustrated in FIGS. 19-29.

Figure 19:
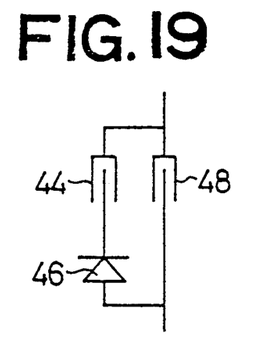
FIGS. 19 through 29 are views illustrating various clutches and brakes usable for the planetary gear transmission according to the present invention.
Figure 20:
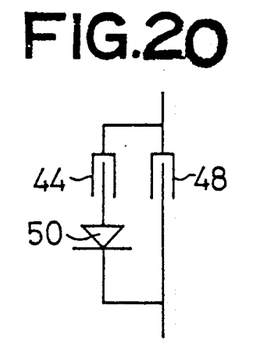
Figure 21:
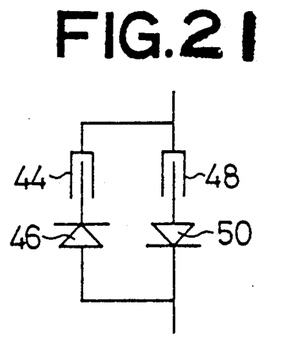

An arrangement shown in FIG. 19 is a combination of a multiple-disk clutch 44 in series connection with a one-way clutch 46, and another multiple-disk clutch 48 in parallel connection with the multiple-disk clutch 44. An arrangement of FIG. 20 uses a one-way clutch 50 in place of the one-way clutch 46 of FIG. 19. The direction in which the one-way clutch 50 transmits power is opposite to the direction in which the one-way clutch 46 transmits power. An arrangement of FIG. 21 is a combination of the multiple-disk clutch 44 in series connection with the one-way clutch 46, and the multiple-disk clutch 48 in series connection with the one-way clutch 50, the two multiple-disk clutches 44, 48 being parallel to each other.

Figure 22:
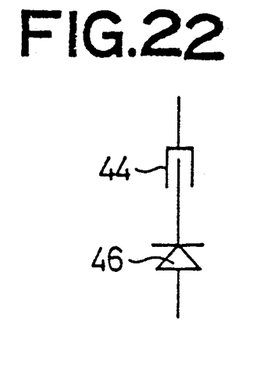
Figure 23:
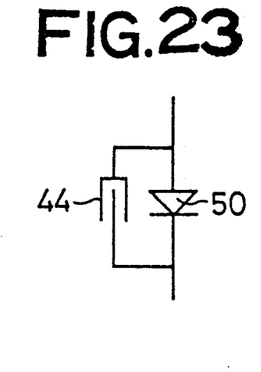
Figure 24:
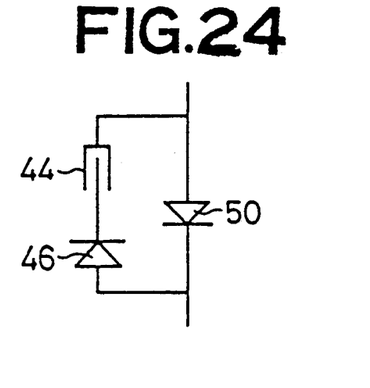

FIG. 22 shows an arrangement consisting of the multiple-disk clutch 44 and the one-way clutch 46 in series connection with each other. An arrangement of FIG. 23 is a combination of the multiple-disk clutch 44 and the one-way clutch 50 in parallel connection with each other. An arrangement of FIG. 24 is a combination of the multiple-disk clutch 44 in series connection with the one-way clutch 46, and the one-way clutch 50 in parallel connection with the clutches 44, 46.

Figure 25:
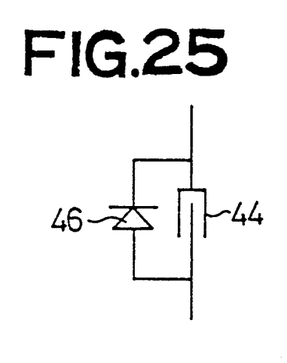
Figure 26:
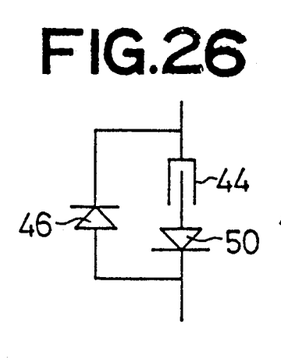
Figure 27:
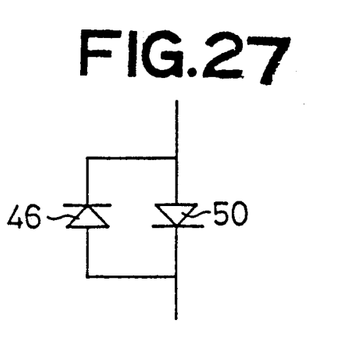

Referring to FIG. 25, there is shown an arrangement in which the multiple-disk clutch 44 and the one-way clutch 46 are connected in parallel to each other. An arrangement of FIG. 26 is a combination of the multiple-disk clutch 44 in series connection with the one-way clutch 50, and the one-way clutch 46 in parallel connection with the clutches 44, 50. A combination of FIG. 27 consists of the two one-way clutches 46, 50 in parallel connection with each other.

Figure 28:
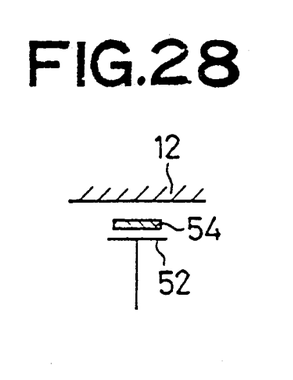
Figure 29:
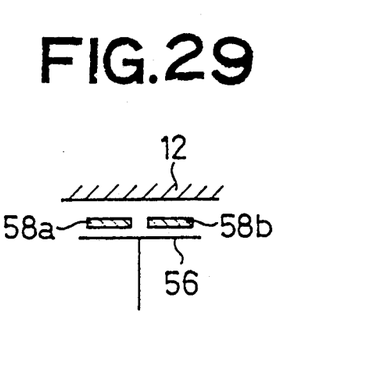

Referring to FIG. 28, there is shown a band brake arrangement in which a brake band 54 fixed at one end thereof to the transmission casing 12 is wound over a drum 52 to which the appropriate member to be braked is fixed. An alternative band brake arrangement is shown in FIG. 29, wherein a pair of brake bands 58a, 58b each fixed at one end thereof to the transmission casing 12 are wound over a drum 56 in the opposite directions. The appropriate member to be braked is fixed to the drum 56.

By utilizing the above arrangements for the clutches K1-K4 and brakes B1-B3, the planetary gear transmission permits economical noise-free downhill or inertia running of the vehicle without engine braking, and deceleration of the vehicle with an engine braking effect, as needed. When the transmission is shifted, the one-way clutches may be automatically released for facilitating a shifting action, eliminating an otherwise necessary intricate timing control of the disengagement and engagement of the coupling devices.

While the present invention has been described in its presently preferred embodiments with a certain degree of particularity, for illustrative purpose only, it is to be understood that the invention may be otherwise embodied.

For example, the torque converter 24 provided in the illustrated embodiments may be provided with a lock-up clutch, or replaced by a fluid coupling, an electro-magnetic clutch using a magnetizable powder or a multiple-disk or single-disk type friction clutch.

While the first, second and third planetary gear units 16, 18 and 20 are coaxially disposed in the order of description in the illustrated embodiments, these gear units may be disposed in the other order.

Although the output shaft 22 is disposed on one side of the transmission remote from the engine 26 and torque converter 24, the output shaft 22 may be replaced by an output gear located on the other side adjacent to the engine and torque converter. In this case, the transmission is modified such that the input shaft 14 extends through the transmission, coaxially with the planetary gear units 16, 18, 20.

While the illustrated embodiments have five forward-drive positions and one or two rear-drive positions, the transmission may be constructed to provide six or more forward-drive positions.

Further, the gear ratios of the planetary gear units and the speed reduction ratios of the individual operating positions of the transmission may be suitably determined.

The locations of the clutches and brakes may be changed as needed with respect to the elements of the planetary gear units.

It is to be understood that the present invention may be embodied with various other changes, modifications and improvements, which may occur to those skilled in the art, in the light of the foregoing teaching.

What is claimed is:

1. A planetary gear transmission for a motor vehicle, including an input member, an output member, a first single-pinion type planetary gear unit having a first sun gear, a first planetary gear meshing with the first sun gear, a first ring gear meshing with the first planetary gear and a first carrier rotatably supporting the first planetary gear, a second single-pinion type planetary gear unit having a second sun gear, a second planetary gear meshing with the second sun gear, a second ring gear meshing with the second planetary gear and a second carrier rotatably supporting the second planetary gear, and a third double-pinion type planetary gear unit having a third sun gear, at least one pair of third planetary gears which mesh with each other and one of which meshes with the third sun gear, a third ring gear meshing with the other of said at least one pair of third planetary gears, and a third carrier rotatably supporting said at least one pair of third planetary gears, said first, second and third planetary gear units being disposed coaxially with each other in the order of description, for transmitting power from said input member to said output member, at a selected one of different speed reduction ratios, wherein the improvement comprises:

said first and second sun gears being associated with each other by one of fixing means for fixing said first and second sun gears to each other, and a coupling device by which said first and second sun gears are connectable to each other;

said first carrier and said second ring gear being associated with each other by one of fixing means for fixing said first carrier and said second ring gear, and a coupling device by which said first carrier and said second ring gear are connectable to each other;

said first and third ring gears being associated with each other by one of fixing means for fixing said first and third ring gears to each other, and a coupling device by which said first and third ring gears are connectable to each other; and said second and third carriers being associated with each other by one of fixing means for fixing said second and third carriers to each other, and a coupling device by which said second and third carriers are connectable to each other.

2. A planetary gear transmission according to claim 1, wherein said second and third carriers are connectable to each other by a coupling device.

3. A planetary gear transmission according to claim 2, wherein said first and second sun gears are fixed to each other for rotation as a unit.

4. A planetary gear transmission according to claim 2, wherein said first carrier and said second ring gear are fixed to each other for rotation as a unit.

5. A planetary gear transmission according to claim 2, wherein said first and third ring gears are fixed to each other for rotation as a unit.

6. A planetary gear transmission according to claim 2, wherein three clutches including a clutch as said coupling device are provided in combination with three brakes, each of said different speed reduction ratios being provided by concurrent engagement of three members selected from among said three clutches and said three brakes.

7. A planetary gear transmission according to claim 2, wherein four clutches including a clutch as said coupling device are provided in combination with three brakes, each of said different speed reduction ratios being provided by concurrent engagement of three members selected from among said four clutches and said three brakes.

8. A planetary gear transmission according to claim 2, wherein two clutches including a clutch as said coupling device are provided in combination with three brakes, each of said different speed reduction ratios being provided by concurrent engagement of two members selected from among said two clutches and said three brakes.

9. A planetary gear transmission according to claim 1, wherein said first and second sun gears are connectable to each other by a coupling device.

10. A planetary gear transmission according to claim 9, wherein said first carrier and said second ring gear are fixed to each other for rotation as a unit.

11. A planetary gear transmission according to claim 9, wherein said first and third ring gears are fixed to each other for rotation as a unit.

12. A planetary gear transmission according to claim 9, wherein said second and third carriers are fixed to each other for rotation as a unit.

13. A planetary gear transmission according to claim 9, wherein three clutches including a clutch as said coupling device are provided in combination with three brakes, each of said different speed reduction ratios being provided by concurrent engagement of three members selected from among said three clutches and said three brakes.

14. A planetary gear transmission according to claim 9, wherein four clutches are provided in combination with three brakes, each of said different speed reduction ratios being provided by concurrent engagement of three members selected from among said four clutches and said three brakes.

15. A planetary gear transmission according to claim 9, wherein two clutches including a clutch as said coupling device are provided in combination with three brakes, each of said different speed reduction ratios being provided by concurrent engagement of two members selected from among said two clutches and said three brakes.

16. A planetary gear transmission according to claim 1, wherein said first carrier and said second ring gear are connectable to each other by a coupling device.

17. A planetary gear transmission according to claim 16, wherein said first and second sun gears are fixed to each other for rotation as a unit.

18. A planetary gear transmission according to claim 16, wherein said first and third ring gears are fixed to each other for rotation as a unit.

19. A planetary gear transmission according to claim 16, wherein said second and third carriers are fixed to each other for rotation as a unit.

20. A planetary gear transmission according to claim 16, wherein three clutches including a clutch as said coupling device are provided in combination with three brakes, each of said different speed ratios being provided by concurrent engagement of three members selected from among said three clutches and said three brakes.

21. A planetary gear transmission according to claim 16, wherein four clutches including a clutch as said coupling device are provided in combination with three brakes, each of said different speed reduction ratios being provided by concurrent engagement of three members selected from among said four clutches and said three brakes.

22. A planetary gear transmission according to claim 16, wherein two clutches including a clutch as said coupling device are provided in combination with three brakes, each of said different speed reduction ratios being provided by concurrent engagement of two members selected from among said two clutches and said three brakes.

23. A planetary gear transmission according to claim 1, wherein said first, second and third planetary gear units cooperate to provide six forward-drive positions and one rear-drive position which have said different speed reduction ratios.

24. A planetary gear transmission according to claim 1, wherein said first, second and third planetary gear units cooperate to provide six forward-drive positions and two rear-drive positions which have said different speed reduction ratios.

* * * * *